(12) United States Patent
Christensen et al.

(10) Patent No.: US 9,607,450 B1
(45) Date of Patent: ***Mar. 28, 2017

(54) SYSTEMS AND METHODS FOR UPDATING A DRIVING TIP MODEL USING TELEMATICS DATA

(71) Applicant: STATE FARM MUTUAL AUTOMOBILE INSURANCE COMPANY, Bloomington, IL (US)

(72) Inventors: Scott Christensen, Salem, OR (US); David J. Dosher, Fitchburg, WI (US); Jufeng Peng, Avon, CT (US); Gregory Hayward, Bloomington, IL (US); William Messner, Urbana, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,073

(22) Filed: Sep. 21, 2016

Related U.S. Application Data

(63) Continuation of application No. 14/541,891, filed on Nov. 14, 2014, now Pat. No. 9,514,578, which is a
(Continued)

(51) Int. Cl.
*G07C 5/08* (2006.01)
*G07C 5/00* (2006.01)
*G06Q 40/08* (2012.01)

(52) U.S. Cl.
CPC ............ *G07C 5/008* (2013.01); *G06Q 40/08* (2013.01); *G07C 5/0841* (2013.01)

(58) Field of Classification Search
CPC ....... G07C 5/008; G07C 5/0841; G06Q 40/08
(Continued)

(56) References Cited

U.S. PATENT DOCUMENTS 5,694,116 A 12/1997 Kojima
5,737,225 A 4/1998 Schulte
(Continued)

FOREIGN PATENT DOCUMENTS

KR 2015000350 1/2015
WO WO-2008/107514 A1 9/2008

OTHER PUBLICATIONS

Airbiquity.com, "Delivering connected vehicle solutions for all your needs," (2014) Retrieved from the Internet on Mar. 3, 2014: URL:http://www.airbiquity.com/.
(Continued)

*Primary Examiner* — Fadey Jabr
*Assistant Examiner* — Angelina Shudy
(74) *Attorney, Agent, or Firm* — Marshall, Gerstein & Borun LLP; Randall G. Rueth (57) ABSTRACT

Methods and systems for improving vehicular safety by utilizing a driving tip model are provided. According to embodiments, an analysis server can analyze telematics data associated with operation of one or more vehicles to identify driving tips that may be aimed to mitigate certain risks or warn of various conditions. The analysis server can provide the driving tips to the vehicles and, in response, receive updated telematics data from the vehicles that reflects operation data for the vehicles subsequent to receiving the driving tips. The analysis server can analyze the updated telematics data to associate certain driving tips with certain telematics data and identify effective driving tips and delivery techniques. The analysis server can update the driving tip model accordingly.

20 Claims, 6 Drawing Sheets

Related U.S. Application Data continuation of application No. 14/019,972, filed on Sep. 6, 2013, now Pat. No. 8,935,036.

(58) Field of Classification Search
USPC .......................................................... 701/29.1
See application file for complete search history.

(56) References Cited

U.S. PATENT DOCUMENTS

| | | | | |
|---|---|---|---|---|
| 7,275,038 | B1* | 9/2007 | Weinstock | G06Q 10/02 |
| | | | | 705/4 |
| 7,571,036 | B2* | 8/2009 | Olsen | B60R 25/1004 |
| | | | | 180/287 |
| 7,991,525 | B2* | 8/2011 | Pryor | G07C 5/008 |
| | | | | 701/31.4 |
| 8,155,865 | B2* | 4/2012 | Bicego, Jr. | G01C 21/3691 |
| | | | | 340/539.13 |
| 8,731,768 | B2* | 5/2014 | Fernandes | G08G 5/0039 |
| | | | | 701/32.3 |
| 8,880,285 | B2* | 11/2014 | Miners | G07C 5/008 |
| | | | | 701/29.2 |
| 8,935,036 | B1* | 1/2015 | Christensen | G07C 5/008 |
| | | | | 701/29.1 |
| 9,127,946 | B1* | 9/2015 | Menon | G01C 21/16 |
| 9,256,992 | B2* | 2/2016 | Davidson | G06Q 10/08 |
| 9,514,578 | B1* | 12/2016 | Christensen | G07C 5/008 |
| | | | | 701/29.1 |
| 2002/0184057 | A1* | 12/2002 | Hayashi | G06Q 40/08 |
| | | | | 705/4 |
| 2003/0149514 | A1* | 8/2003 | Hessling | G01C 21/26 |
| | | | | 701/1 |
| 2006/0161342 | A1 | 7/2006 | Tomoda | |
| 2007/0143002 | A1* | 6/2007 | Crowell | G07C 5/004 |
| | | | | 701/123 |
| 2008/0105482 | A1* | 5/2008 | Yamaguchi | G05B 15/02 |
| | | | | 180/271 |
| 2008/0120175 | A1 | 5/2008 | Doering | |
| 2009/0210257 | A1 | 8/2009 | Chalfant et al. | |
| 2009/0216396 | A1* | 8/2009 | Yamagata | A61B 5/02055 |
| | | | | 701/31.4 |
| 2010/0131300 | A1* | 5/2010 | Collopy | G06Q 30/0224 |
| | | | | 705/4 |
| 2011/0153372 | A1* | 6/2011 | Weinstock | G06Q 10/02 |
| | | | | 705/4 |
| 2012/0004933 | A1* | 1/2012 | Foladare | G06Q 40/00 |
| | | | | 705/4 |
| 2012/0065834 | A1 | 3/2012 | Senart et al. | |
| 2012/0109692 | A1 | 5/2012 | Collins et al. | |
| 2012/0212353 | A1 | 8/2012 | Fung et al. | |
| 2012/0232747 | A1* | 9/2012 | Miners | G07C 5/006 |
| | | | | 701/33.9 |
| 2013/0151288 | A1 | 6/2013 | Bowne et al. | |
| 2013/0204455 | A1 | 8/2013 | Chia et al. | |
| 2013/0282271 | A1 | 10/2013 | Rubin et al. | |
| 2013/0317736 | A1 | 11/2013 | Fernandes et al. | |
| 2014/0244111 | A1* | 8/2014 | Gross | B60W 50/14 |
| | | | | 701/36 |
| 2014/0257873 | A1 | 9/2014 | Hayward et al. | |
| 2014/0277902 | A1 | 9/2014 | Koch | |
| 2014/0358357 | A1 | 12/2014 | Jones et al. | |
| 2014/0358358 | A1* | 12/2014 | Jones | G07C 5/008 |
| | | | | 701/31.4 |
| 2014/0372017 | A1* | 12/2014 | Armitage | B60W 40/09 |
| | | | | 701/117 |
| 2015/0066341 | A1* | 3/2015 | Von Holt | G08G 1/096716 |
| | | | | 701/117 |
| 2015/0133164 | A1* | 5/2015 | Song | G06Q 10/10 |
| | | | | 455/456.3 |
| 2016/0117928 | A1* | 4/2016 | Hodges | G07C 5/008 |
| | | | | 701/99 |

OTHER PUBLICATIONS

Automatic.com " An Auto Accessory to Make You a Smarter Driver," (2013) Retrieved from the Internet on Mar. 3, 2014: URL:http://www.automatic.com/.

Dash.by, "App + Device + Car Simple steps to make your car smarter," Retrieved from the Internet on Mar. 3, 2013: URL:https://dash.by/.

directgeneral.com, "Direct Auto Insurance, Be Direct", (2014). Retrieved from the Internet on Feb. 27, 2014: URL:http://www.directgeneral.com/direct-drive.aspx.

Farmers Engage for Farmers Insurance Company of Oregon, dated Jul. 1, 2013.

metromile.com, "If we made your car any smater, it'd need a pocket proctector", (2013). Retrieved from the Internet on Feb. 27, 2014: URL:https://www.metromile.com.

mycar-connection.com, "Audiovox Car Connection," (2013) Retrieved from the Internet on Mar. 3, 2014: URL:http://www.mycar-connection.com/information/.

Sayer et al., "Naturalistic Driving Performance During Secondary Tasks," pp. 224-230 Retrieved from the Internet on Mar. 3, 2014: URL:http://drivingassessment.uiowa.edu/DA2007/PDF/039_SayerDevonshire.pdf.

Sayer et al., "The Effects of Secondary Tasks on Naturalistic Driving Performance," pp. 1-48, (2005) Retrieved from the Internet on Mar. 3, 2014: URL:http://deepblue.lib.umich.edu/bitstream/handle/2027.42/57450/99225.pdf;jsessionid=22CE01AF30988BD183A91F86497A0314?sequence=1.

StateFarm.com, "Safe Driver Discount,"(2013). Retrieved from the Internet on Jan. 10, 2014: 1. https://www.statefarm.com/insurance/auto/discounts/drive-safe-save.

StateFarm.com, "Auto Join and Enjoy Insurance Discounts," (2013). Retrieved from the Internet on Jan. 10, 2014: https://www.statefarm.com/insurance/auto/discounts/steer-clear.

StateFarm.com, "Road Aware," (2014). Retrieved from the Internet on Jan. 10, 2014: http://teendriving.statefarm.com/road-aware.

StateFarm.com, "Road Trips," (2014). Retrieved from the Internet on Jan. 10, 2014: http://teendriving.statefarm.com/road-trips.

StateFarm.com, "State Farm® Driver Feedback™ for iPhone,"(2009). Retrieved from the Internet on Jan. 10, 2014: https://www.statefarm.com/about-us/innovation-research/mobile-apps/driver-feedback-for-iphone.

StateFarm.com, "Welcome to the State Farm® Learning Resource Center," (2013). Retrieved from the Internet on Jan. 10, 2014: https://www.statefarm.com/customer-care/learning-resource-center.

umich.edu/~driving/guidelines/guidelines.html, "All the Major Telematics Guidelines We've Seen" Retrieved from the Internet on Mar. 3, 2014: URL:http://www.umich.edu/~driving/guidelines/guidelines.html.

web2.drivingbuddy.com, "Driving Buddy," (2013) Retrieved from the Internet on Mar. 3, 2013: URL:http://web2.drivingbuddy.com/.

* cited by examiner

| STATE FARM | POLICIES & ACCOOUNTS | PAYMENTS & TRANSFERS | LEARN & PLAN | DRIVING TIPS | LOGOUT |

— 451

WELCOM, JOHN!

DRIVING TIPS

- IN MARCH, YOU AVERAGED 10 MPH OVER THE SPEED LIMIT. PLEASE TRY TO REDUCE YOUR SPEED.

- CONSIDER COMBINING YOUR TRIPS TO SAVE ON GAS MONEY.

- APRIL CAN HAVE ESPECIALLY WET CONDITIONS. PLEASE USE EXTRA CAUTION WHEN DRIVING IN THE RAIN.

- YOU ARE ACCELERATING MORE GRADUALLY. NICE WORK!

SYSTEMS AND METHODS FOR UPDATING A DRIVING TIP MODEL USING TELEMATICS DATA

CROSS-REFERENCE TO RELATED APPLICATIONS

The present application is a continuation of U.S. patent application Ser. No. 14/541,891, which was filed on Nov. 14, 2014, which is a continuation of U.S. patent application Ser. No. 14/019,972, now U.S. Pat. No. 8,935,036, which was filed on Sep. 6, 2013. These applications are incorporated by reference herein in their entireties.

FIELD OF THE DISCLOSURE

This disclosure generally relates to increasing driving or vehicular safety, and in particular, to analyzing vehicle telematics data associated with vehicle operation to improve the effectiveness of providing driving tips to vehicle drivers or operators.

BACKGROUND

There is a constant effort to improve vehicular safety to, among other reasons, reduce the risk of accidents as well as mitigate the damage caused by accidents. Additionally, improved vehicular safety can result in reduced costs for vehicle operators, such as reduced auto insurance premiums. Various existing techniques aim to reduce the risk of accidents such as, for example, websites that provide general tips on safe driving and various applications that examine driving data to identify relevant tips to provide to drivers. However, these techniques are not able to measure the effectiveness of any provided tips and, as a result, these techniques must rely on extensive data examination as well as manual identification and testing of various tips.

Accordingly, there is an opportunity to develop systems and methods for analyzing driving tips and how they are delivered, as well as measuring results associated with providing the driving tips to vehicle operators.

SUMMARY

In an embodiment, a computer implemented method of improving vehicular safety is provided. The method includes receiving a set of telematics data associated with a vehicle, analyzing, by one or more processors, the set of telematics data to identify a driving tip associated with a driving tip model, and providing, by the one or more processors, the driving tip to the vehicle or to an account associated with the vehicle, receiving a set of updated telematics data from the vehicle. The method further include determining, by the one or more processors, an effectiveness of the driving tip including: comparing the set of telematics data to the set of updated telematics data, and analyzing at least one of how and/or when the driving tip was provided to the vehicle. Further, the method includes updating, by the one or more processors, the driving tip model to reflect the effectiveness of the driving tip.

In another embodiment, a system for improving vehicular safety is provided. The system comprises a communication module adapted to receive telematics data from a vehicle, a memory adapted to store the telematics data and a driving tip model, and a processor adapted to interface with the communication module and the memory. The processor is configured to execute computer executable instructions stored in the memory to cause the processor to analyze the set of telematics data to identify a driving tip associated with the driving tip model, provide, via the communication module, the driving tip to the vehicle or to an account associated with the vehicle, and receive a set of updated telematics data from the vehicle via the communication module. The processor is further configured to determine an effectiveness of the driving tip including: compare the set of telematics data to the set of updated telematics data, and analyze at least one of how and/or when the driving tip was provided to the vehicle; and update the driving tip model to reflect the effectiveness of the driving tip.

DETAILED DESCRIPTION

The novel methods and systems disclosed herein generally relate to improving a driving tip model that includes driving tips and various parameters related to the effectiveness of the driving tips. According to embodiments, an analysis server can receive various telematics data from one or more vehicles, where the telematics data includes vehicle operation data. Using the telematics data, the analysis server can create or modify the driving tip model to associate certain driving tips with certain driving behaviors and/or with trip-based data associated with the vehicles.

Additionally, the analysis server can analyze, using the driving tip model, any received telematics data for a specific vehicle to identify a driving tip that may be helpful to provide to the specific vehicle. The analysis server can provide the driving tip to the vehicle and also receive updated telematics data from the vehicle that can represent vehicle operation data collected subsequent to the vehicle operator receiving or accessing the driving tip. The analysis server can analyze the updated telematics data, for example by comparing the updated telematics data to the telematics data and/or the driving tip model, to determine an effectiveness of the provided driving tip. It should be appreciated that the analysis can be performed using various mathematical models and calculations. Based on the analysis, the analysis server can improve or optimize the driving tip model so that the identification and/or delivery of subsequent driving tips can be more effective. In some embodiments, the analysis server (or a third party entity) may use the driving tip model to price, create, or underwrite various insurance policies (e.g., an auto insurance policy for a vehicle).

The creation and improvement of the driving tip model results in an effective and efficient way to improve vehicular safety. By analyzing telematics data to identify more effective and relevant driving tips to provide to drivers, the risk of vehicular accidents or crashes may be reduced. Further, by receiving updated telematics data from vehicles, companies are able to improve the driving tip models over time. The driving tip models may also be used to accurately underwrite more affordable insurance policies. As a result, not only will savings pass to consumers, but auto insurance participation may increase.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Typically, a person or customer (or an agent of the person or customer) of an insurance provider fills out an application for an insurance policy. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, insurance policy may be in-force, e.g., the policyholder is enrolled.

Figure 1:
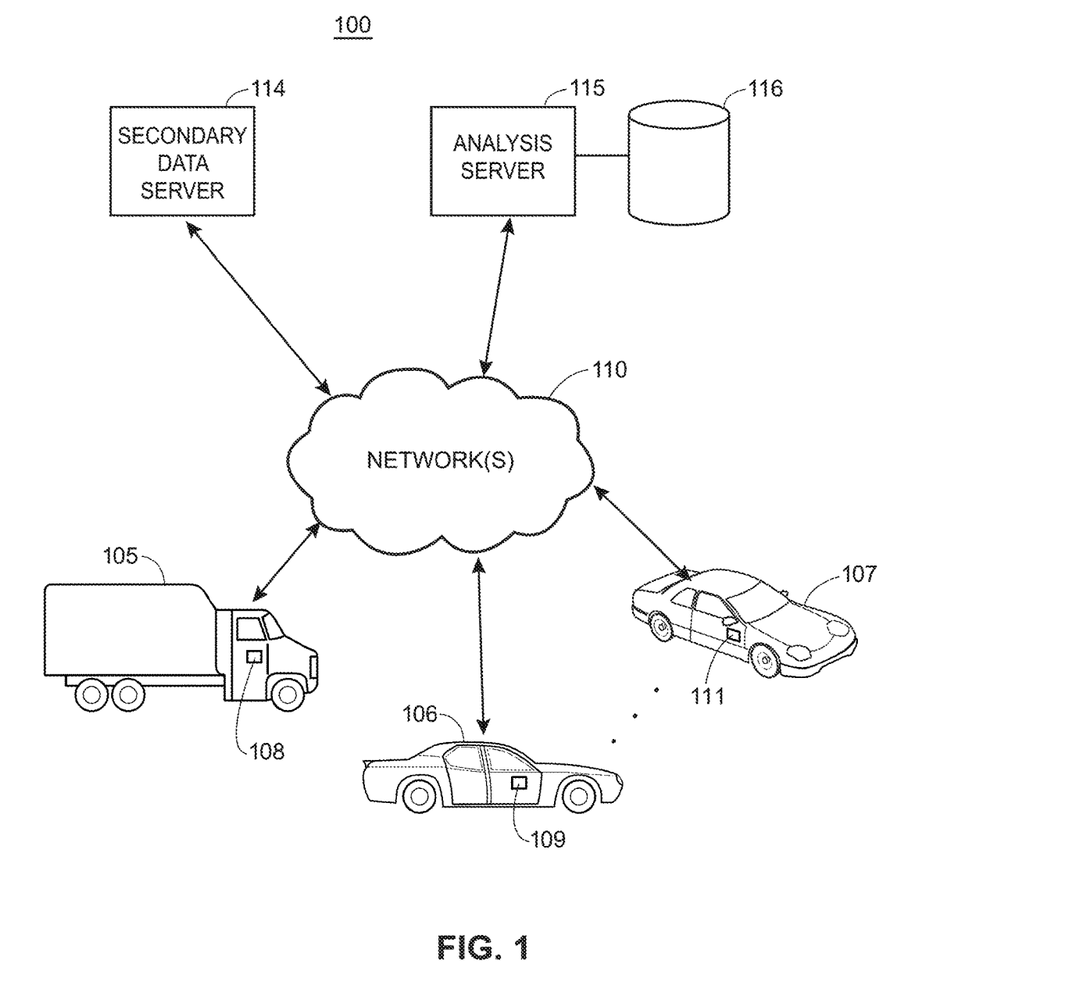
FIG. 1 depicts an example environment including components and entities associated with driving tip safety techniques in accordance with some embodiments.

FIG. 1 depicts an example environment 100 associated with creating, updating, and maintaining a driving tip model. Although FIG. 1 depicts certain entities and components, it should be appreciated that additional or alternate entities and components are envisioned.

As shown in FIG. 1, the environment 100 includes example vehicles 105, 106, 107 which may be, for example, cars, trucks, motorcycles, motorbikes, scooters, boats, recreational vehicles, or any other type of vehicle capable of being operated or driven by a vehicle operator. Although only three vehicles 105, 106, 107 are depicted in FIG. 1, it should be appreciated that fewer or more vehicles are envisioned. According to embodiments, each of the vehicles 105, 106, 107 can be equipped with a respective computer device 108, 109, 111 capable of sensing, receiving, maintaining, or consolidating telematics data associated with the vehicles 105, 106, 107. For example, the telematics data can include behavioral data such as speed, lateral and longitudinal acceleration, revolutions per minute (RPM), seat belt usage, turn signal usage, steering data, throttle data, video and/or audio data collected by a camera or other type of recording device, or other data associated with vehicle operation, such as data collected from respective CAN busses or other external devices; trip-based data such as GPS location, time of day, day of week, fuel consumption, road conditions (e.g., city, highway, number of lanes, speed limits, dangerous intersections, frequent deer crashes, traffic conditions, traffic signs, etc.), information about the type of trip or route (e.g., familiar trip to work or school, familiar trip close to home, unfamiliar trip far from home, etc.), weather (e.g., temperature, precipitation, wind, fog, severe weather alert, weather conditions, etc.); or any other information about the trip.

In some embodiments, the computer devices 108, 109, 111 can include sensors capable of detecting and storing one or more of the various types of telematics data. For example, the computer devices 108, 109, 111 may include an accelerometer capable of measuring the acceleration of the respective vehicles 105, 106, 107. In other embodiments, the computer devices 108, 109, 111 may interface with one or more sensors or a computer of the vehicles 105, 106, 107 to receive one or more various types of telematics data sensed or gathered by the sensors or the computer. In further embodiments, the computer devices 108, 109, 111 may connect with a secondary data server 114 to receive one or more of the various types of telematics or other secondary data. For example, the computer devices 108, 109, 111 may retrieve maps data, weather data, and/or other data from the secondary data server 114. It should be appreciated that the computer devices 108, 109, 111 can receive or gather telematics data via a combination of two or more of these embodiments. It should further be appreciated that the computer devices 108, 109, 111 can connect to multiple secondary data servers 114 to retrieve telematics data.

Referring to FIG. 1, the environment 100 further includes an analysis server 115 coupled to a database 116. In embodiments, the analysis server 115 can be any combination of hardware and software, and the database 116 can include any type of storage capable of storing data such as telematics data. For example, the database 116 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The computer devices 108, 109, 111 can each connect to the analysis server 115 via a network 110 such as, for example, a wide area network (WAN), a local area network (LAN), a personal area network (PAN), or other networks. The network 110 can facilitate any type of data communication via any standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). Similarly, the computer devices 108, 109, 111 can each connect to the secondary data server 114 via the network 110 to request and/or receive various telematics data. Further, the analysis server 115 can connect to the secondary data server 114 via the network 110 to request and/or receive telematics and other data. It should be appreciated that the analysis server 115 and the secondary data server 114 can be combined into a single entity. It should further appreciated that the computer devices 108, 109, 111 can connect to another third party entity such as a telematics data aggregation component (not shown in FIG. 1), which can receive telematics data from the computer devices 108, 109, 111 and then provide the telematics data to the analysis server 115.

The components of the environment 100 can implement the systems and methods that compile telematics data, provide driving tips to operators of the vehicles 105, 106, 107, and improve driving tip models. According to embodiments, the analysis server 115 can create and maintain (e.g., in the database 116) a driving tip model that includes a plurality of various driving tips and other data associated with operation of the vehicles 105, 106, 107. The driving tips can include behavioral-based tips (e.g., "Slow down, you are driving 10 mph over the speed limit," "Be careful, swerving is dangerous," etc.), trip-based tips (e.g., "Be careful, you are approaching a dangerous intersection," "Wet roads today, please slow down and avoid hydroplaning, etc."), or other tips. The analysis server 115 can associate certain telematics data with certain driving tips. For example, the analysis server 115 can update the driving tip model to associate rapid acceleration with an acceleration tip such as "you could save gas if you accelerate more gradually." Further, the analysis server 115 can use certain telematics data to identify or create relevant driving tips. For example, the analysis server 115 can correlate vehicle location data (e.g., GPS data received from the computer device 108 of the vehicle 105) with severe weather data (e.g., weather data retrieved from the secondary data server 114) based on the vehicle location to identify the driving tip "severe weather alert in your area, please proceed with caution." It should be appreciated that a user or administrator associated with the analysis server 115 can build the driving tip model by creating driving trips and/or associating certain driving tips with certain telematics data.

According to embodiments, the analysis server 115 can store supplemental information associated with the vehicles 105, 106, 107 and operators thereof. For example, the supplemental information can include information about the vehicle operators (e.g., name, age, gender, etc.), information about the vehicles 105, 106, 107 (e.g., make, model, body style, model year, etc.), and other data. Further, the analysis server 115 can receive telematics data from the respective computer devices 108, 109, 111 via the network 110. The analysis server 115 can analyze the telematics data with any relevant supplemental information to identify any driving tips from the driving tip model that may be relevant to the telematics data or that may otherwise aim to mitigate (or encourage) a behavior or trip-based situation identified in the telematics data. In some embodiments, the analysis server 115 can create driving tips based on the received telematics data. For example, if the telematics data indicates that the vehicle 105 is traveling 13 miles per hour over the speed limit, the analysis server 115 can create a driving tip specifying that the vehicle operator is traveling 13 miles per hour over the speed limit and encouraging the vehicle operator to slow down.

Figure 2:
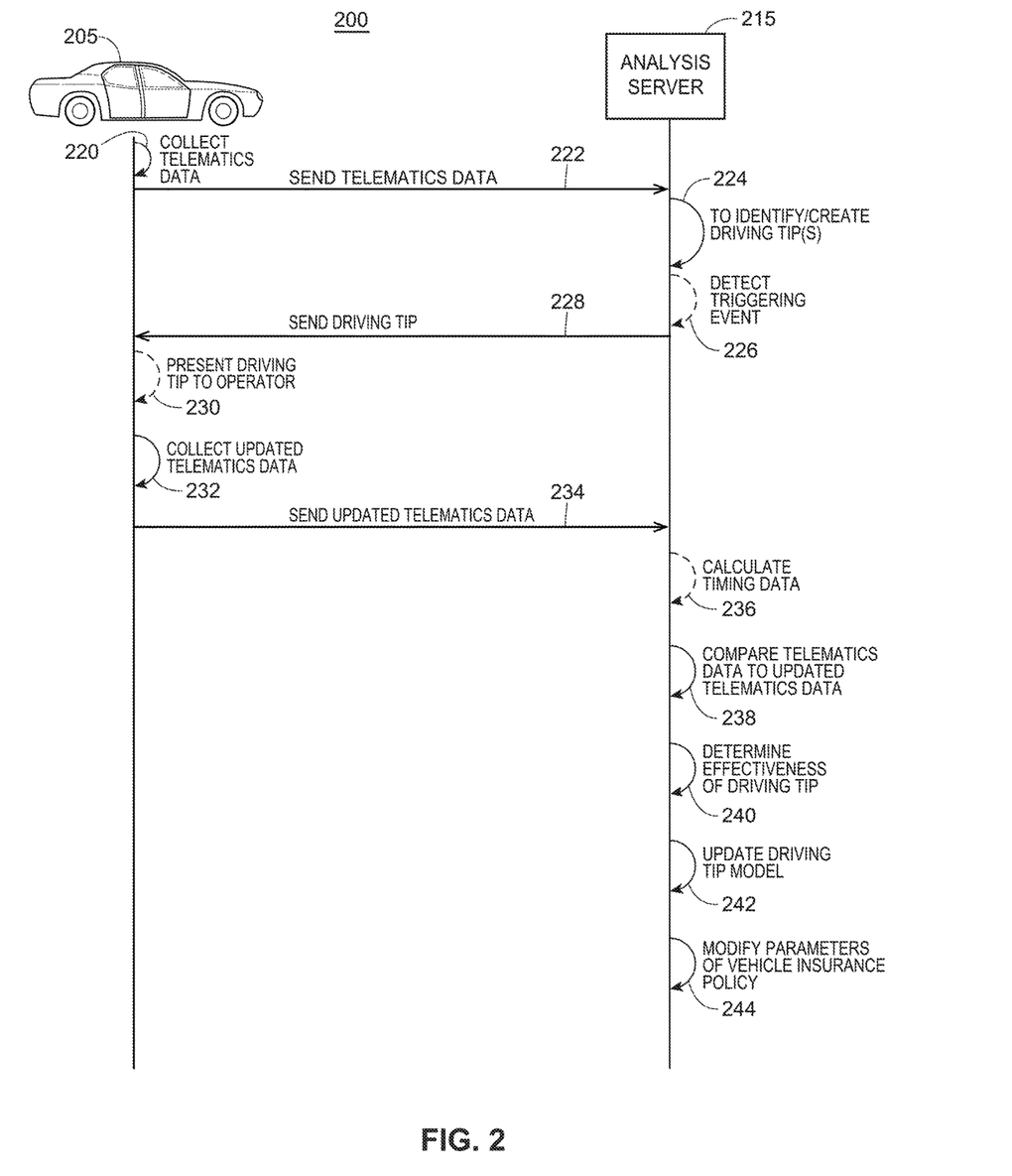
FIG. 2 depicts an example diagram associated with providing driving tips and updating driving tip models in accordance with some embodiments.

Referring to FIG. 2, depicted is a diagram 200 illustrating techniques for providing driving tips to vehicle operators and improving driving tip models. In particular, FIG. 2 includes a vehicle 205 (such as the vehicle 105 as described with respect to FIG. 1) and an analysis server 215 (such as the analysis server 115 as described with respect to FIG. 1).

As shown in FIG. 2, the vehicle 205 can collect 220 telematics data, such as the behavioral-based data, trip-based data, or other data as discussed herein. In embodiments, the vehicle 205 can collect the telematics data in real time or at periodic intervals (e.g., every 5 seconds, every minute, every hour, etc.). Further, the vehicle 205 can collect telematics data during operation of the vehicle or when the vehicle is not being operated. It should be appreciated that the vehicle 205 can collect the telematics data from components associated with the vehicle 205 or from a remote server such as the secondary data server 114. The vehicle 205 can send 222 the telematics data to the analysis server 215, such as via a cellular network or other type of network. In embodiments, the vehicle 205 can send the telematics data in real-time as the vehicle 205 collects the telematics data, at one or more scheduled times, when a computing device of the vehicle 205 is connected to a network, or according to other timings or schedules. It should be appreciated that the vehicle 205 (as well as other vehicles not shown in FIG. 2) can send the telematics data to the analysis server 215 on multiple occasions.

The analysis server 215 can analyze 224 the telematics data to identify or create one or more driving tips. According to embodiments, the driving tip can be associated with a driving tip model that contains parameters and other data related to the association of various telematics data to various driving tips. In some cases, the analysis server 215 can match or compare the telematics data to supplemental information about the vehicle operator or the vehicle 205 itself. For example, a speed control driving tip may be more relevant or effective when provided to a driver above 30 years of age as compared to a driver below 20 years of age. According to embodiments, the analysis server 215 may examine existing data of the driving tip model, as well as any received telematics data and/or supplemental information to determine variables that are predictive of crashes, accidents, or other hazardous events, whereby the driving tips can aim to mitigate, reduce, or eliminate the hazardous events. For example, the driving tip model can indicate that traveling at least 15 mph over the posted speed limit results in a greater risk of an accident. It should be appreciated that the analysis server 215 may employ or utilize any mathematical model, technique, or algorithm to create or identify the driving tips or otherwise update the driving tip model such as, for example, regression, decision trees, neural networks, association rules, clustering, support vector machines, and/or others. In some embodiments, the analysis server 215 can update the driving tip model, or any mathematical model employed thereon, according to other techniques to generate additional driving tips, modify existing driving tips, or otherwise refine the driving tip model or mathematical model. In particular, the analysis server 215 can update the driving tip model as the analysis server 215 receives new telematics data or employs new or alternate mathematical models.

According to embodiments, the analysis server 215 may add to the driving tip model (e.g., by creating new driving tips or associating certain driving tips with certain predictive variables) as new telematics data is received from the vehicle 205 and/or other vehicles (not shown in FIG. 2). The analysis server 215 can further associate supplemental data associated with the vehicle 205 and other vehicles with the driving tips. As discussed herein, the driving tips may be behavioral-based tips or trip-based tips. In embodiments, the driving tips may be positive or negative, that is, either as a compliment or encouragement for some type of behavior or as a suggestion to improve a behavior; or a notification to warn or notify a vehicle operator of a trip-based condition or other condition(s).

The analysis server 215 can optionally detect 226 a triggering event associated with providing a driving tip to the vehicle 205. According to embodiments, the triggering event may be a specific time (e.g., end of day, week, month, etc.), a detection of a certain behavior (e.g., a sharp turn, a slam on the brakes, etc.) or pattern (e.g., consistent swerving, consistent speeding, etc.), a detection of a hazardous road condition (e.g., an approaching dangerous intersection, hazardous weather, holiday/seasonal driving, etc.), or any other triggering event. The analysis server 215 can provide 228 the driving tip to the vehicle 205. In some embodiments, the analysis server 215 may provide the tip to a computing device associated with the vehicle 205 (or with an individual associated with the vehicle 205) via an electronic communication such as a text message, email, text-to-voice or other audible message, etc., or a phone call. For example, the analysis server 215 can send a text message to a mobile device of the vehicle operator. In other embodiments, the analysis server 215 can update an online account associated with an operator (or another individual such as the owner) of the vehicle 205, where the account update can indicate the driving tip. The analysis server 215 can provide the driving tip at a scheduled time or in response to identifying the driving tip or detecting the triggering event.

A computing device associated with the vehicle 205 can receive the driving tip and optionally present 230 the driving tip (for example via a user interface) to an operator of the vehicle 205. In some embodiments, the operator or another individual associated with the vehicle 205 may retrieve online account data (such as via a website or application) that indicates the driving tip. The vehicle 205 can collect 232 updated telematics data. It should be appreciated that the vehicle 205 can collect the updated telematics data at one or more various times such as immediately after receipt of the driving tip, at one or more scheduled times after receipt of the driving tip, or at other times. The vehicle 205 can send 234 the updated telematics data to the analysis server 215.

The analysis server 215 can optionally calculate 236 timing data associated with one or more of sending the original driving tip, receiving of the updated telematics data, or timing data associated with the telematics data. Further, the analysis server 215 can compare 238 the original telematics data for the vehicle 205 to the updated telematics data for the vehicle 205. For example, assume that the original driving tip informed the vehicle operator that he/she was traveling 20 mph over the speed limit and the updated telematics data indicates that the vehicle 205 slowed down to the speed limit (along with a timestamp corresponding to when the vehicle 205 slowed down). The analysis server 215 can calculate the amount of time between sending the original driving tip to the vehicle 205 and the timestamp indicating the reduction in speed by the vehicle 205. Based on the comparison of the telematics data to the updated telematics data, the analysis server 215 can identify outcomes resulting from providing the driving tip. In some cases, the outcomes can be associated with updated telematics data collected immediately or shortly after providing the driving tip, or updated telematics data collected at scheduled intervals (e.g., daily, weekly, monthly, etc.). The analysis server 215 can store the updated telematics data as well as results of the comparisons and/or any identified outcome(s).

The analysis server 215 can determine 240 an effectiveness of the driving tip that was provided to the vehicle 205. Stated differently, the analysis server 215 can improve or optimize the driving tip model by determining which driving tips (as well as when and how the driving tips are provided, the timing of the updated telematics data resulting from providing the driving tip, and to whom the driving tips are provided) are most likely to produce desired outcomes. In embodiments, the analysis server 215 can employ or utilize any mathematical model, technique, or algorithm to create or identify the driving tips or otherwise update the driving tip model such as, for example, regression, decision trees, neural networks, association rules, clustering, support vector machines, and/or others. In some cases, the mathematical model, technique, or algorithm can use the desired outcomes as dependent variables and the driving tips, the timing of the driving tips, and the driving tip delivery methods as the independent variables.

For example, the analysis server 215 can determine that providing a driving tip informing a vehicle operator of an upcoming dangerous intersection reduces the risk of an accident. Further, the analysis server 215 can determine that providing the upcoming dangerous intersection tip when the vehicle 205 is 100 feet away from the intersection is more effective than providing the upcoming dangerous intersection tip when the vehicle 205 is 20 feet away from the intersection. For further examples, the analysis server 215 can determine that providing a driving tip that encourages a vehicle operator to combine multiple trips to save on gas money is more effective when provided to a 40-year-old female than it is when provided to a 17-year-old male. Further, for example, the analysis server 215 can determine that a driving tip that encourages a vehicle operator to reduce speed is more effective when provided repeatedly over time than when provided only a single time or a few times, as the repeated reminder gradually leads to the vehicle operator decreasing his/her average traveling speed.

After determining the effectiveness of the driving tip, the analysis server 215 can update 242 the driving tip model accordingly. In some cases, the analysis server 215 can associate the determined effectiveness (e.g., a percentage or some other parameter) with the corresponding driving tip, along with other details regarding providing the driving tip such as which demographics the tips are effective with, as well as notable timing and delivery frequency metrics. In some embodiments in which the analysis server 215 determines that a certain driving tip is effective, the analysis server 215 can provide an encouraging message or communication to the vehicle 205 (e.g., "You successfully lowered your speed to a more manageable rate. Keep up the good work!"). It should be appreciated that the analysis server 215 and the vehicle 205 can repeatedly perform any or all of 220, 222, 224, 228, 226, 230, 232, 234, 236, 238, 240, and 242 to improve, update, and/or optimize the driving tip model.

The analysis server 215 (or another entity such as an insurance provider) can create or modify 244 one or more vehicle insurance policies based on the driving tip model, the telematics data associated with the vehicle 205, and/or other parameters. Further, the analysis server 215 or the other entity can use the driving tip model to rate or underwrite various insurance policies. By separating out trip-based risks and behavioral-based risks, entities such as insurance providers are able to segment auto insurance risks, predict certain behaviors, accurately price and underwrite various insurance policies, and receive better feedback. Further, the entities can leverage conventional telematics variables with the driving tip model for more efficient risk segmentation and can use data from the driving tip model to more easily explain insurance policies to customers and regulators. Additionally, the improvement and optimization of driving trips to produce desired safety outcomes can save lives, reduce injuries, result in fewer crashes, and ultimately lead to a greater auto insurance participation rate. It should be appreciated that other benefits of the embodiments as described herein are envisioned.

Figure 3:
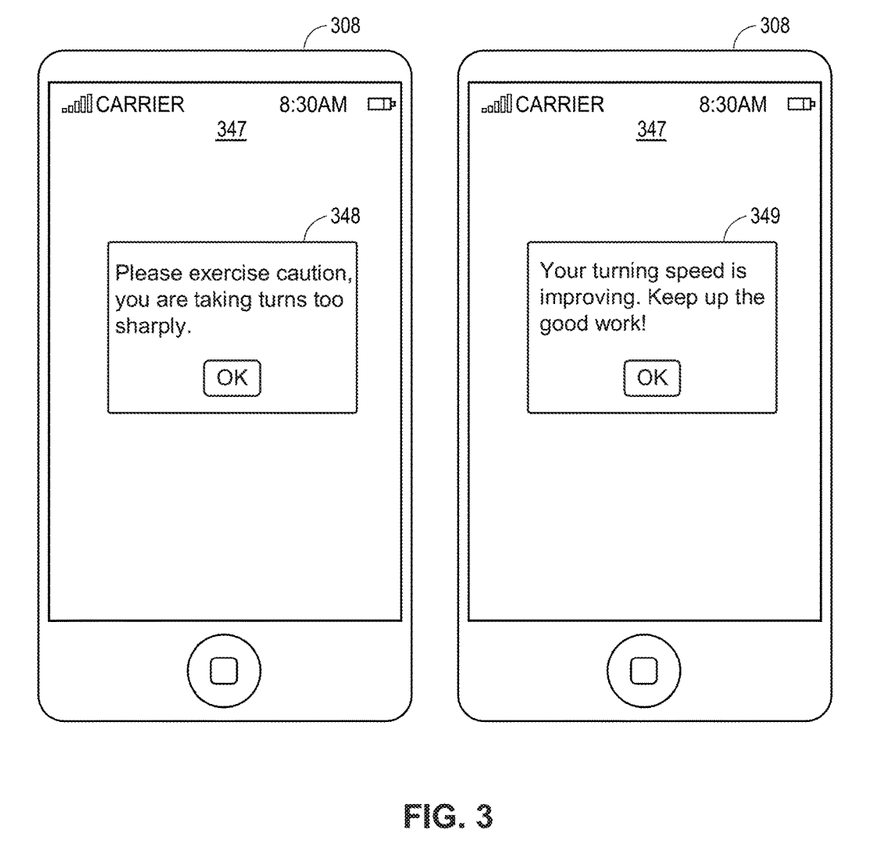
FIG. 3 depicts example interfaces associated with driving tips in accordance with some embodiments.

Referring to FIG. 3, depicted are two instances of an exemplary computer device 308 (such as the computer device 108 as described with respect to FIG. 1) and interfaces 347 thereof. As discussed herein, the computer device 308 is configured to present a driving tip to an operator of a vehicle. The computer device 308 is depicted as a mobile device, however it should be appreciated that the computer device 308 can be other devices, such as tablet computer, a notebook computer, or an interface associated with the vehicle itself (e.g., a navigation screen or other type of display screen or interface).

As shown on the left side of FIG. 3, the interface 347 includes a notification 348 displaying the example driving tip "Please exercise caution, you are taking turns too sharply." According to embodiments, the computer device 308 can display the notification 348 in response to receiving the example driving tip from an analysis server (such as when the analysis server determines, from telemetrics data of the associated vehicle, that the vehicle operator is navigating through turns too quickly). As discussed herein, subsequent to displaying the notification 348, the computer device 308 can collect updated telematics data and send the updated telematics data to the analysis server for an assessment of the effectiveness of the driving tip.

As shown on the right side of FIG. 3, the interface 347 includes a notification 349 displaying the information "Your turning speed is improving. Keep up the good work!" According to embodiments, the computer device 308 can display the notification 349 in response to the analysis server examining the updated telematics data and determining that the vehicle operator is improving his/her speed through turns. To encourage this improvement, the analysis server can send the notification (i.e., an encouraging driving tip) to the computer device 308 for presentation to the vehicle operator.

Figure 4:
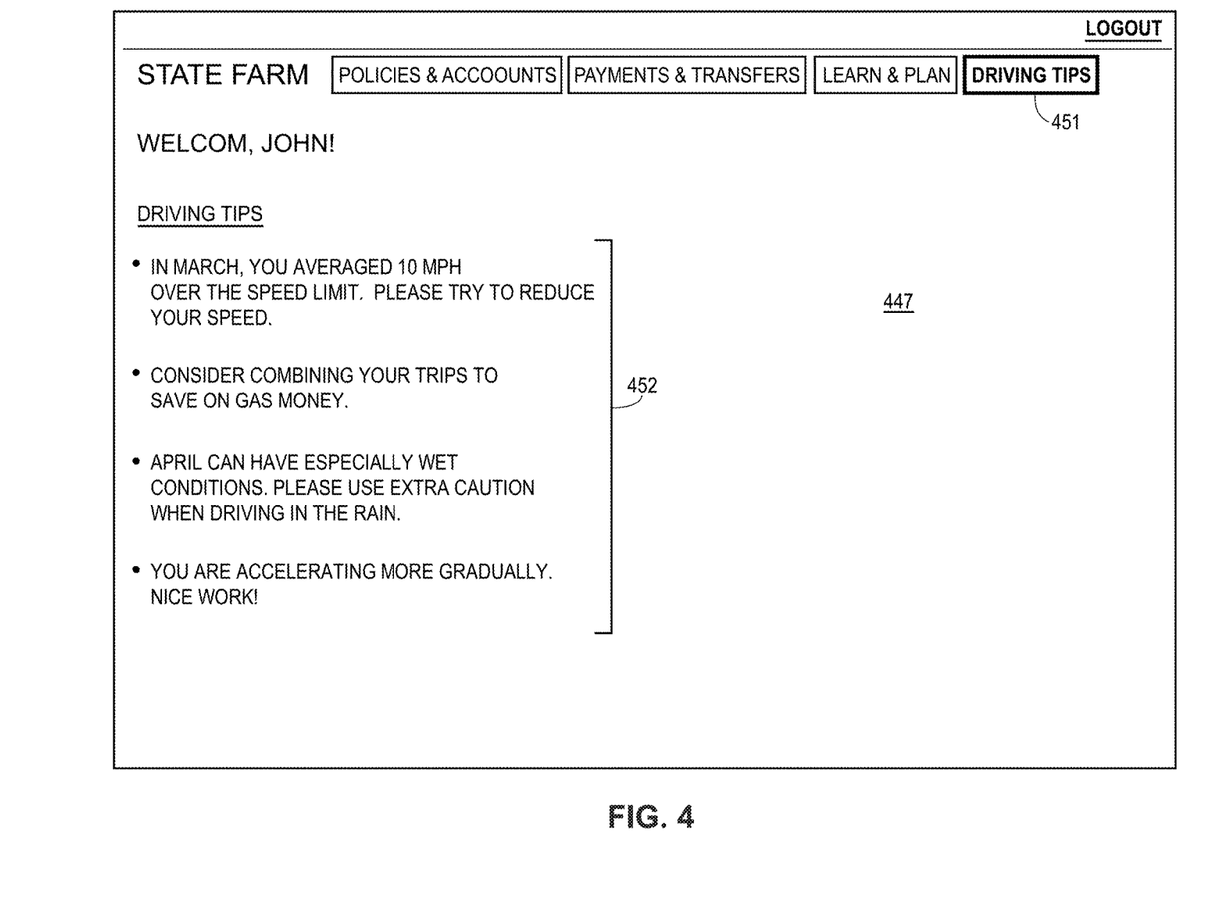
FIG. 4 depicts an example interface associated with driving tips in accordance with some embodiments.

Referring to FIG. 4, depicted is an example interface 447 accessible and viewable by a vehicle operator or other individual associated with a vehicle. In embodiments as shown, the interface 447 can be an online interface associated with a user account with an insurance provider. It should be appreciated that the user may access the interface 447 via any type of device, such as a computer device as discussed with respect to FIG. 1, or any other device capable of displaying the content.

As shown in FIG. 4, the interface 447 includes a selection 451 for "Driving Tips." If the user selects the selection 451, the interface 447 can display one or more driving tips 452 associated with the user account. According to embodiments, a computer such as the analysis server 215 can create, identify, and compile the driving tips 452 based on various telematics data received from a vehicle associated with the user as well as on an analysis of an associated driving tip model. The driving tips may indicate various telematics data associated with a certain time period along with a driving tip to remedy the associated behavior (e.g., "In March, you averaged 10 mph over the speed limit. Please try to reduce your speed."). Further, the driving tips may caution about upcoming specific or general weather conditions (e.g., "April can have especially wet conditions. Please use extra caution when driving in the rain."). Still further, the driving tips may include encouraging comments associated with an improved user behavior (e.g., "You are accelerating more gradually. Nice work!"). It should be appreciated that other driving tips are envisioned.

Figure 5:
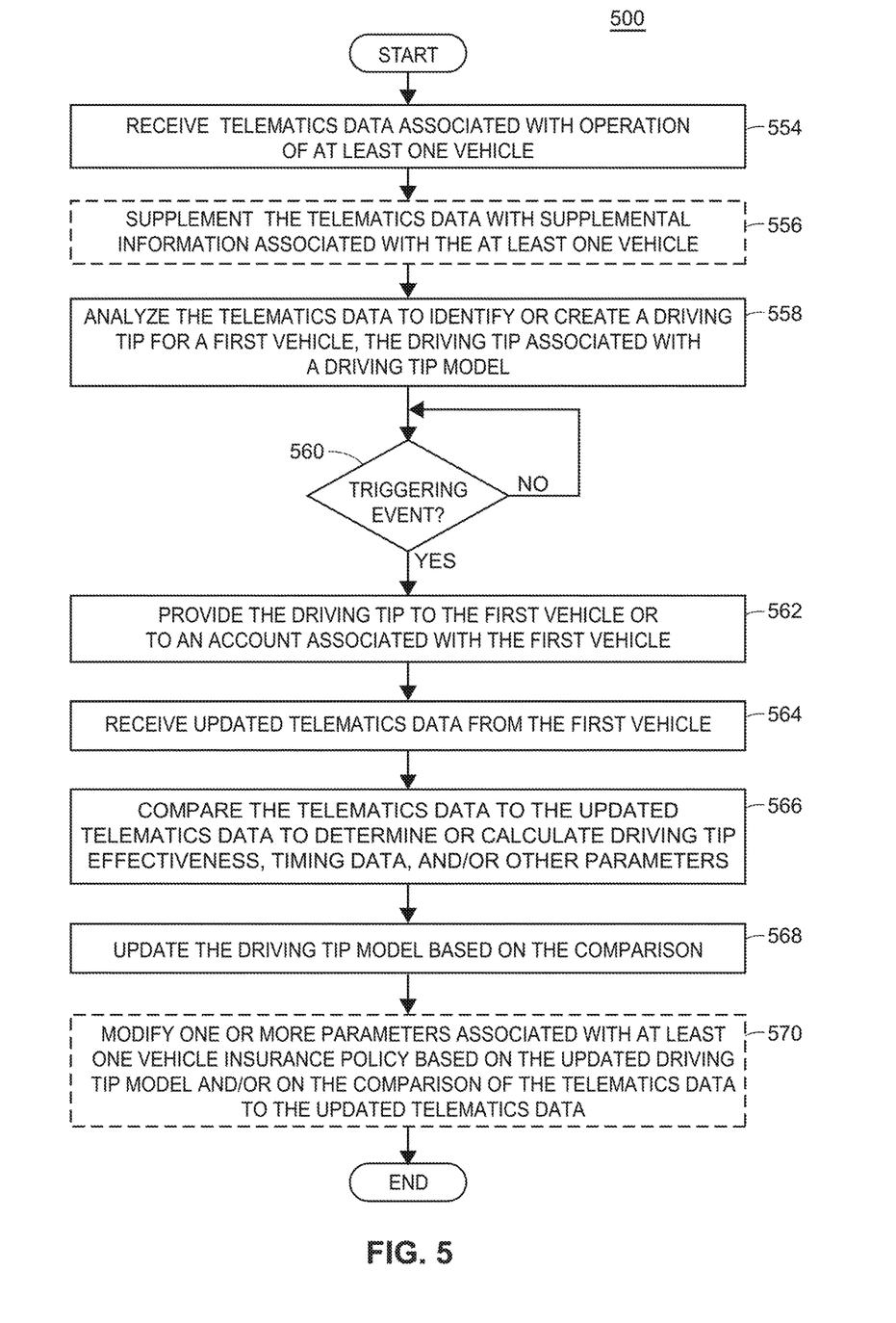
FIG. 5 depicts a flow diagram of providing driving tips and updating driving tip models in accordance with some embodiments

FIG. 5 is an example method 500 for analyzing telematics data and improving a driving tip model. At least a portion of the method 500 may be performed by one or more computing devices, in an embodiment. For example, the method 500 may be performed by a server such as the analysis server 115 as described with respect to FIG. 1.

The computing device can receive (block 554) telematics data associated with operation of at least one vehicle. In some embodiments, the computing device can receive the telematics data from multiple vehicles, and at one or multiple random or scheduled times. Further, the computing device can receive the telematics data via a network such as a cellular network. In some embodiments, the computing device can receive other data or information from a third party source, such as the secondary data server 114 as discussed with respect to FIG. 1. The computing device can optionally supplement (block 556) the telematics data with supplemental information associated with the at least one vehicle. In embodiments, the supplemental information can include demographics information associated with the vehicle operators or information about the vehicles themselves. The computing device can analyze (block 558) the telematics data to identify or create a driving tip for a first vehicle (e.g., one of the vehicles associated with the received telematics data). As discussed herein, the driving tip can be associated with a driving tip model that includes associations between and among telematics data, various existing driving tips, any supplemental information, and/or any third party data. In some embodiments, the computing device can identify the driving tip that intends to mitigate, remedy, or warn of a specific driving behavior or route condition, encourage a specific good behavior, or cause other results or convey other information. In other embodiments, the computing device can create a new driving tip according to the analysis.

The computing device can optionally determine (block 560) whether a triggering event has been detected. In embodiments, the triggering event may be a specific time (e.g., end of day, week, month, etc.), a detection of a certain behavior (e.g., a sharp turn, a slam on the brakes, etc.) or pattern (e.g., consistent swerving, consistent speeding, etc.), a detection of a hazardous road condition (e.g., an approaching dangerous intersection, hazardous weather, holiday/seasonal driving, etc.), or any other triggering event. If a triggering event has not been detected ("NO"), processing can pause until a triggering event has been detected, or can proceed to any other functionality. If a triggering event has been detected ("YES"), processing can proceed to block 562 where the computing device can provide the driving tip to the first vehicle or to an account associated with the first vehicle. In some embodiments, the computing device can send the driving tip to a computer device (e.g., the computer device 108) associated with the first vehicle for presentation to a vehicle operator. In other embodiments, the computing device can update an account associated with the vehicle operator (or another individual associated with the first vehicle) such that the vehicle operator or individual may access the account to view or retrieve the driving tip.

The computing device can receive (block 564) updated telematics data from the first vehicle. According to embodiments, the computing device can receive the updated telematics data immediately or shortly after providing the driving tip, or at one or more scheduled times. The computing device can compare (block 566) the telematics data to the updated telematics data. In some embodiments, the computing device can analyze the telematics data and the updated telematics data (as well as timing data associated therewith) to determine an effectiveness of the driving tip. Further, the computing device can explicitly identify a hazardous risk from the telematics data and determine a mitigation level associated with the hazardous risk from the updated telematics data (i.e., how effectively the vehicle operator mitigated the hazardous risk after receiving the driving tip).

The computing device can update (block 568) the driving tip model based on the comparison. In particular, the computing device can associate the provided driving tip with any calculated effectiveness, any relevant supplemental information, any effective delivery methods or delivery times, or any other calculations or data. The computing device (or a third party entity such as an insurance provider) can optionally update (block 570) at least one vehicle insurance policy based on the updated driving tip model and/or on the comparison of the telematics data to the updated telematics data. For example, the computing device can adjust a driving score, insurance premium, or other metric associated with an insurance policy (or a driver thereof), based on any operating adjustments the driver made in response or subsequent to receiving any driving tips. In embodiments, the computing device (or the third party entity) may use the driving tip model to price or underwrite various policies, among other benefits.

Figure 6:
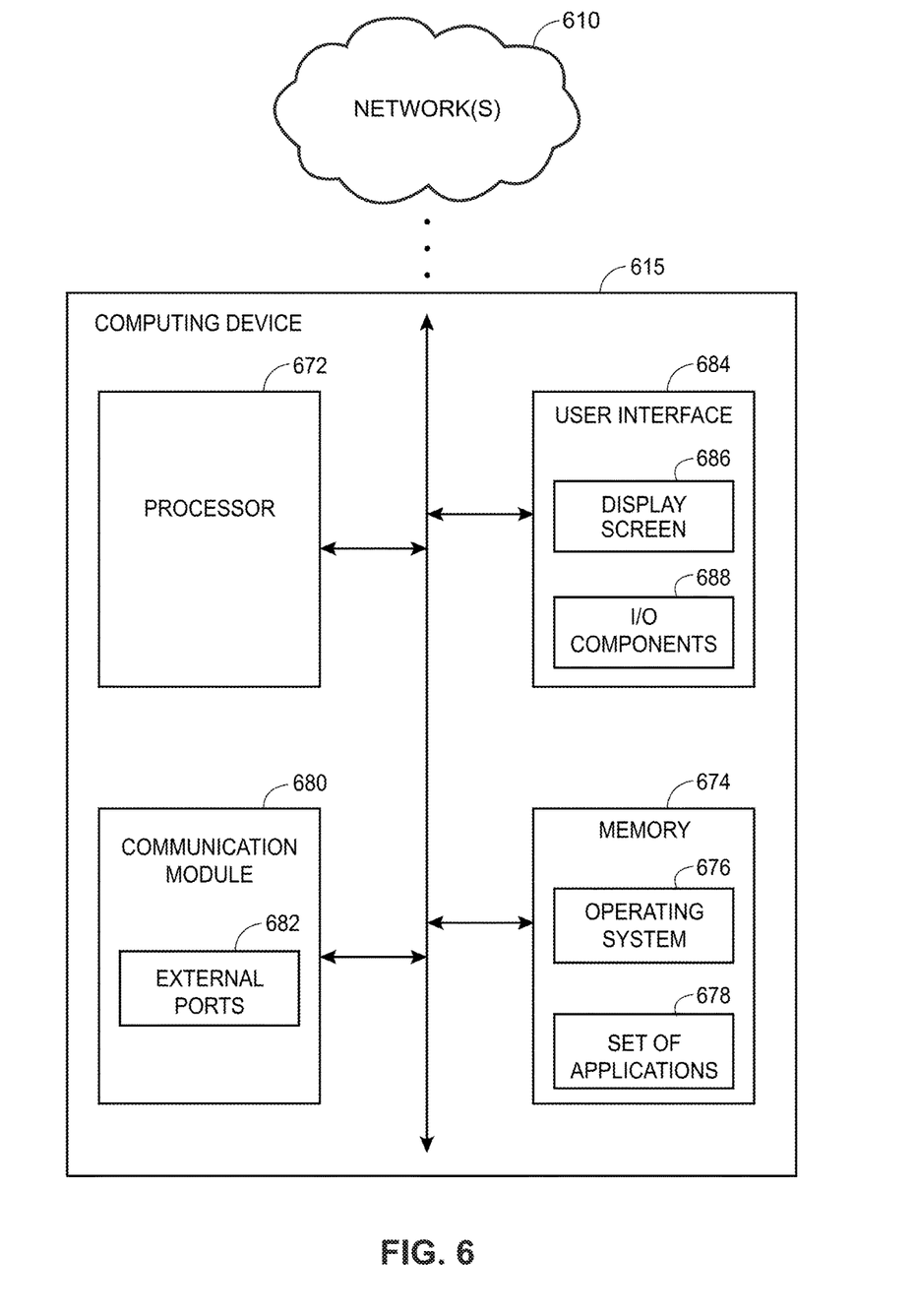
FIG. 6 is a block diagram of a computing device in accordance with some embodiments.

FIG. 6 illustrates an example computing device 615 (such as the analysis server 115 as discussed with respect to FIG. 1) in which the functionalities as discussed herein may be implemented. The computing device 615 can include a processor 672 as well as a memory 674. The memory 674 can store an operating system 676 capable of facilitating the functionalities as discussed herein as well as a set of applications 678. For example, one of the set of applications 678 can analyze telematics data, identify driving tips, updated driving tip models, and perform other functionalities as discussed herein. The processor 672 can interface with the memory 674 to execute the operating system 676 and the set of applications 678. According to embodiments, the memory 674 can also store data associated with the driving tip model, including any received telematics data, driving tips, supplemental information associated with vehicles, insurance data, associations between and among the data, and other data. The memory 674 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The computing device 615 can further include a communication module 680 configured to communicate data via one or more networks 610. According to some embodiments, the communication module 680 can include one or more transceivers (e.g., WWAN, WLAN, and/or WPAN transceivers) functioning in accordance with IEEE standards, 3GPP standards, or other standards, and configured to receive and transmit data via one or more external ports 682.

For example, the communication module 680 can receive telematics data from one or more vehicles via the network 610 and can receive any supplemental data or relevant data associated with driving tip models from a third party entity or component. For further example, the computing device 615 can transmit driving tips to vehicles via the communication module 680 and the network(s) 610. The computing device 615 may further include a user interface 684 configured to present information to a user and/or receive inputs from the user. As shown in FIG. 10, the user interface 684 includes a display screen 686 and I/O components 688 (e.g., ports, capacitive or resistive touch sensitive input panels, keys, buttons, lights, LEDs, speakers, microphones, and others). According to embodiments, the user may access the computing device 615 via the user interface 684 to examine driving tip models, initiate the transfer of driving tips to vehicles, price or underwrite insurance policies, and/or perform other functions.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 672 (e.g., working in connection with the operating system 676) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and systems described herein are illustrative only and are not limiting upon the scope of the claims.

We claim:

1. A computer implemented method of improving vehicular safety, the method comprising:
 receiving, via a network, a set of telematics data associated with a vehicle operated by a vehicle operator, the vehicle operator having a set of demographics, the set of telematics data received during operation of the vehicle;
 analyzing, by one or more processors, the set of telematics data to (i) identify a hazardous risk, and (ii) identify, from a driving tip model, a driving tip that is associated with the set of telematics data;
 detecting a triggering event associated with the vehicle;
 in response to detecting the triggering event, providing, by the one or more processors, the driving tip to the vehicle or to an account associated with the vehicle;

immediately after providing the driving tip to the vehicle, receiving, via the network, a set of updated telematics data from the vehicle;

determining, by the one or more processors, an effectiveness of the driving tip by examining the set of updated telematics data to determine a mitigation level corresponding to how effectively the vehicle operator mitigated the hazardous risk after receiving the driving tip;

updating, by the one or more processors, the driving tip model to associate the effectiveness of the driving tip with the set of demographics of the vehicle operator, wherein the driving tip model further associates an additional effectiveness of the driving tip with a different set of demographics of an additional vehicle operator;

determining, by the one or more processors, an overall effectiveness of the driving tip based on the effectiveness of the driving tip and the additional effectiveness of the driving tip; and updating, by the one or more processors, the driving tip model to reflect the overall effectiveness of the driving tip.

2. The method of claim 1, wherein analyzing the set of telematics data comprises:
supplementing the set of telematics data with supplemental information associated with the vehicle; and
identifying the driving tip based on the set of telematics data that was supplemented.

3. The method of claim 1, wherein analyzing the set of telematics data comprises:
analyzing the set of telematics data to identify the driving tip from the driving tip model, wherein the driving tip is one of a behavioral-based tip or a trip-based tip.

4. The method of claim 1, wherein detecting the triggering event comprises:
detecting at least one of: a scheduled time, a pattern identified in the set of telematics data, and an upcoming condition associated with a route of the vehicle.

5. The method of claim 1, wherein receiving the set of updated telematics data from the vehicle comprises:
receiving a portion of the set of updated telematics data from the vehicle at a first time; and
receiving an additional portion of the set of updated telematics data from the vehicle at a second time.

6. The method of claim 1, further comprising:
updating an insurance policy associated with the vehicle based on the comparison of the set of telematics data and the set of updated telematics data.

7. The method of claim 1, wherein determining the effectiveness of the driving tip is further by:
calculating timing data based on (i) a first elapsed time between when the driving tip is provided and when the hazardous risk will be encountered and (ii) a second elapsed time between when the driving tip is provided and when the set of updated telematics data is received.

8. The method of claim 7, wherein updating the driving tip model to reflect the overall effectiveness of the driving tip comprises:
associating the timing data with the driving tip.

9. The method of claim 1, further comprising:
after determining the effectiveness of the driving tip, providing a message to the vehicle.

10. The method of claim 1, wherein examining the set of updated telematics data to determine the mitigation level comprises:
determining that providing the driving tip reduced a risk of accident.

11. A system for improving vehicular safety, comprising:
a communication module adapted to receive, via a network, a set of telematics data from a vehicle operated by a vehicle operator, the vehicle operator having a set of demographics, the set of telematics data received during operation of the vehicle;
a memory adapted to store the set of telematics data and a driving tip model; and
a processor adapted to interface with the communication module and the memory, wherein the processor is configured to execute computer executable instructions stored in the memory to cause the processor to:
analyze the set of telematics data to (i) identify a hazardous risk, and (ii) identify, from the driving tip model, a driving tip that is associated with the set of telematics data,
detect a triggering event associated with the vehicle,
in response to detecting the triggering event, provide, via the communication module, the driving tip to the vehicle or to an account associated with the vehicle,
immediately after providing the driving tip to the vehicle, receive, via the network, a set of updated telematics data from the vehicle via the communication module,
determine an effectiveness of the driving tip by examining the set of updated telematics data to determine a mitigation level corresponding to how effectively the vehicle operator mitigated the hazardous risk after receiving the driving tip, and
update the driving tip model to associate the effectiveness of the driving tip with the set of demographics of the vehicle operator, wherein the driving tip model further associates an additional effectiveness of the driving tip with a different set of demographics of an additional vehicle operator.

12. The system of claim 11, wherein to analyze the set of telematics data, the processor is configured to:
supplement the set of telematics data with supplemental information associated with the vehicle, and
identify the driving tip based on the set of telematics data that was supplemented.

13. The system of claim 11, wherein the driving tip is one of a behavioral-based tip or a trip-based tip.

14. The system of claim 11, wherein to detect the triggering event, the processor is configured to:
detect at least one of: a scheduled time, a pattern identified in the set of telematics data, and an upcoming condition associated with a route of the vehicle.

15. The system of claim 11, wherein to receive the set of updated telematics data from the vehicle, the processor is configured to:
receive a portion of the set of updated telematics data from the vehicle at a first time, and
receive an additional portion of the set of updated telematics data from the vehicle at a second time.

16. The system of claim 11, wherein the processor is further configured to:
update an insurance policy associated with the vehicle based on the comparison of the set of telematics data and the set of updated telematics data.

17. The system of claim 11, wherein the processor determines the effectiveness of the driving tip further by calculating timing data based on (i) a first elapsed time between when the driving tip is provided and when the hazardous risk will be encountered and (ii) a second elapsed time between when the driving tip is provided and when the set of updated telematics data is received.

18. The system of claim 17, wherein to update the driving tip model to reflect the overall effectiveness of the driving tip, the processor is configured to:
associate the timing data with the driving tip.

19. The system of claim 11, wherein the processor is further configured to:
after determining the effectiveness of the driving tip, provide a message to the vehicle.

20. The system of claim 11, wherein the processor determines the effectiveness of the driving tip further by determining that providing the driving tip reduced a risk of accident.

* * * * *